United States Patent [19]

Suzuki

[11] Patent Number: 4,822,320

[45] Date of Patent: Apr. 18, 1989

[54] RATCHET-TYPE TENSIONER WITH POSITIVE BACKLASH

[75] Inventor: Tadasu Suzuki, Kawagoe, Japan

[73] Assignee: Tsubakimoto Chain Co., Japan

[21] Appl. No.: 212,938

[22] Filed: Jun. 29, 1988

[30] Foreign Application Priority Data

Jul. 7, 1987 [JP] Japan .................................. 62-167890

[51] Int. Cl.4 ............................................... F16H 7/08
[52] U.S. Cl. ...................................... 474/111; 474/136
[58] Field of Search ............... 474/101, 109, 110, 111, 474/136, 138, 135, 133

[56] References Cited

FOREIGN PATENT DOCUMENTS 0195945 10/1986 European Pat. Off. ............ 474/111
1212383 3/1966 Fed. Rep. of Germany ...... 474/111
0049451 5/1981 Japan ................................... 474/111

Primary Examiner—Thuy M. Bui
Attorney, Agent, or Firm—Howson & Howson

[57] ABSTRACT

A ratchet-type tensioner for maintaining tension with positive backlash in a chain, belt or similar power transmission device wrapped around sprockets or sheaves. A spring-biased plunger protrudes from a housing against the device. A rack formed on the plunger meshes with a ratchet which is pivotally connected to the housing to permit a positive backlash not less than a predetermined minimum.

7 Claims, 4 Drawing Sheets

FIG.I
PRIOR ART
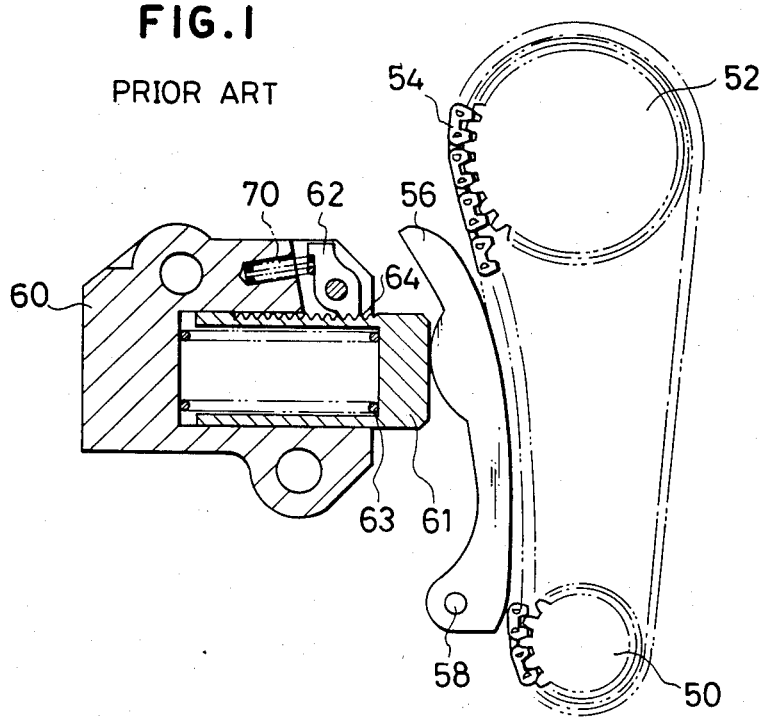
FIG.2
PRIOR ART
FIG.3
PRIOR ART
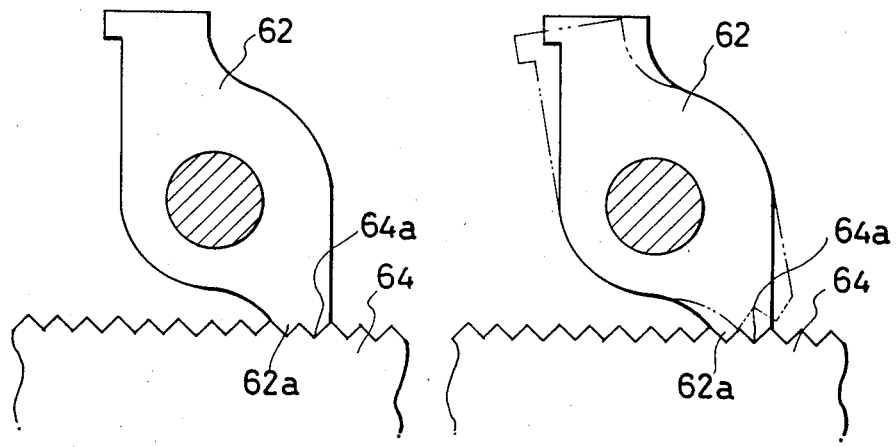

RATCHET-TYPE TENSIONER WITH POSITIVE BACKLASH

FIELD OF INVENTION

This invention relates to ratchet-type tensioners for wrapped power transmissions.

BACKGROUND OF INVENTION

Ratchet-type tensioners provide a certain degree of tension to a chain, belt or similar power transmission device wrapped around rotating members to prevent noise or unmeshing of teeth in the case of a toothed belt. Tension is imparted by a lever arm or shoe against the belt or chain between the members by a spring or fluid-actuated plunger with a ratchet to limit plunger backlash. As explained in further detail hereinafter, the amount of backlash is often insufficient for certain power transmissions resulting in component breakage.

SUMMARY OF INVENTION

Accordingly, it is an object of the present invention to provide a ratchet-type tensioner having a positive backlash as compared with the conventional ratchet-type tensioner having almost no backlash.

This and other objects and novel features of the invention are accomplished by a ratchet-type tensioner comprising a housing, a plunger mounted in sliding engagement with the housing and formed with a rack, a spring for biasing the plunger in a protruding direction, and a ratchet supported on the housing in meshing engagement with the rack being biased in a reverse direction by means of a spring. The ratchet is supported such that at least 0.5 mm backlash is provided immediately after the advancement of the rack in the protruding direction according to the equation:

$$B = \sqrt{x^2 - \frac{P^2}{4} \tan^2 \theta + P y \tan\theta} - \left(x + \frac{P}{2}\right)$$

For a ratchet-type tensioner of the present invention, at least 0.5 mm of backlash is secured between the ratchet and the rack, even when a load is generated in the direction opposite to the urging force of spring subsequent to the advancement of the rack by the spring or subsequent to an abrupt advancement of the rack due to vibration, and consequently, such fluctuations may be absorbed by said backlash. Excessive load which may otherwise be imparted to the tensioner shoe or the tensioner itself may thus be absorbed or avoided.

BRIEF DESCRIPTION OF THE DRAWINGS

FIG. 1 is a partly sectioned view of an application of a prior art ratchet-type tensioner;

FIG. 2 is a referential engagement position of the prior art tensioner of FIG. 1;

FIG. 3 is another view of the prior art tensioner of FIG. 2;

DETAILED DESCRIPTION

Figure 4:
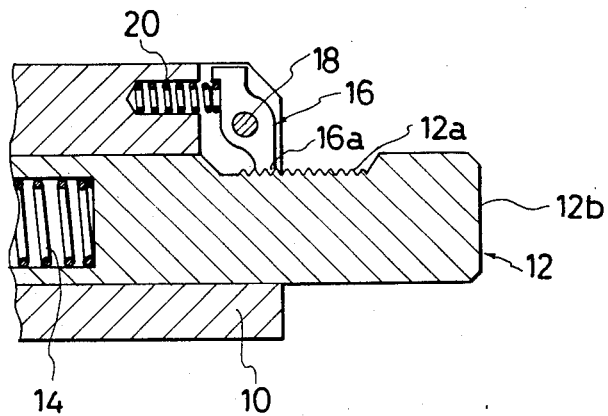
FIG. 4 is a section of a ratchet type tensioner according to the present invention.

A conventional ratchet-type tensioner, such as shown in FIG. 1, has insufficient backlash for certain uses. A plunger 61 is mounted in sliding engagement with a housing 60 and is formed with a rack 64, a spring 63 for biasing the plunger 61 in a protruding direction, and a ratchet 62 supported on the housing 60 in meshing engagement with the rack 64, the ratchet being biased in a reverse direction by means of a spring 70. Reference numerals 50, 52 and 54 denote a sprocket secured to a crank shaft, a sprocket secured to a cam shaft and a chain for transmitting power between those sprockets, respectively. One end of a tensioner shoe 56 is supported by a pin 58. The chain 54 may be imparted tension as result of the tensioner shoe 56 being pushed by the plunger 61.

The prior art tensioner of FIG. 1 is conventionally called a "ratchet-type no-return" tensioner with substantially no backlash. Hence, in case the inter-axis distance alters due to thermal influence or the rack 64 abruptly advances due to the instantaneous vibration of the chain 54, the tensioner shoe 56 tends to receive an excessive load from the chain 54, which may cause breakage of the tensioner shoe 56.

The housing to which the sprockets 50 and 52 are secured is usually made of aluminum, and the chain 54 is made of steel; the housing will thermally expand and the inter-axis distance between the sprockets 50 and 52 will become slightly longer. Then, the increase in the tension of the chain 54, due to the difference in the coefficients of expansion, will impart a force to the tensioner shoe 56 in the receding direction. Then, if there is no backlash in the tensioner in the receding direction, the tensioner shoe 56 will be sandwiched between the chain 54 and the plunger 61 and pushed toward the chain 54 forcibly, which will cause the breakage of the tensioner shoe 56.

By way of another illustration, in case the chain vibrates violently due to the fluctuation in torque, the instant that the chain has become loose, the meshing engagement tends to advance by one pitch; and the original meshing condition may not be restored even when the chain has become tense again, which will be another cause of breakage of the tensioner shoe.

Here, the operation of a prior art tensioner with almost no backlash will be explained with reference to FIGS. 2 and 3. FIG. 2 shows the meshing condition of the ratchet 62 and the rack 64 in the reference position; and in FIG. 3, the phantom line illustrates the condition of the rack 64 and the ratchet 62 immediately before the rack 64 advances by one pitch in relation to the ratchet 62, and the solid line shows the condition immediately after said advancement, respectively. In case of the conventional "no-return" tensioner, as shown in FIG. 3, the ratchet 62 in the position immediately after the advancement by one pitch is back in almost the same position as the reference position; and generally speaking, an extremely small amount of backlash in the order of 0.2 to 0.3 mm is available between the tip 62a of the pawl and the bottom 64a of the rack. Consequently, the plunger 61 will be substantially prevented from receding as result of said restricted engagement, which will cause breakage of the tensioner shoe as mentioned above.

FIG. 4 shows the overall structure of a ratchet-type tensioner according to the present invention. To a housing 10 is slidably fit a hollow cylindrical plunger 12 which is urged in a protruding direction by means of a spring 14. A part of the plunger 12 is formed with a rack 12a on the circumferential surface thereof which is adapted to engage with pawls 16a of the ratchet 16. An end face 12b of the plunger 12 is urged by spring 14 against a transmission member such as a chain (not shown) and imparts tension thereto. The ratchet 16 is rotatably supported by a pin 18 relative to the housing 10 and its one end is normally urged by a spring 20 to engage with the rack 12a.

Figure 5:
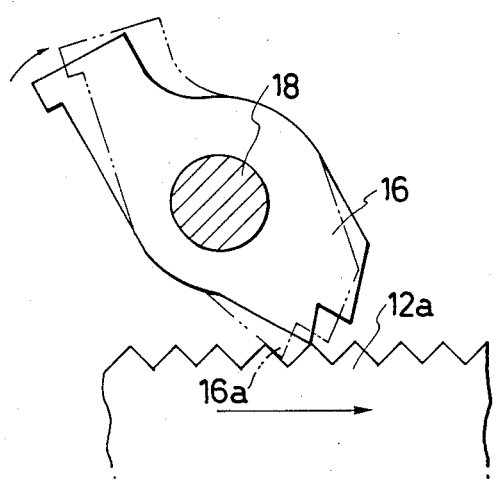
FIGS. 5 and 6 depict the operation of the tensioner of the present invention.
Figure 6:
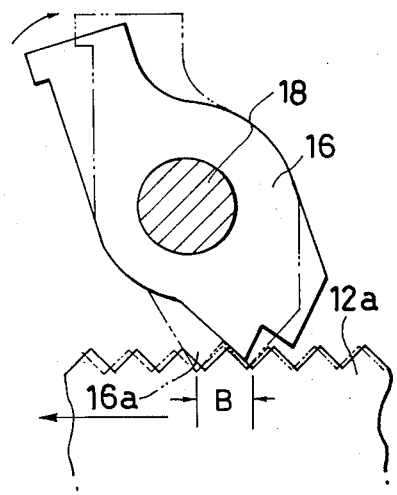

With reference to FIGS. 5 and 6, the mechanisms for imparting tension to a transmission chain and for absorbing a load in the direction opposite to the urging force of the spring will be explained. The solid line in FIG. 5 shows the instant that the rack 12a advances by one pitch. The phantom line illustrating the ratchet 16 depicts the position of the ratchet immediately after the advancement, which is the same position as indicated by the solid line in FIG. 6. At this position, the ratchet 16 is capable of accommodating the movement of the rack 12a in the receding direction; the most-backward position of the ratchet is shown by the phantom line in FIG. 6. The ratchet 16 is supported by the pin 18 relative to the housing 10 to provide at least a 0.5 mm backlash immediately after advancement by one pitch. The arrows in each figure indicate the direction the rack moves.

By supporting the ratchet 16 in such a position as explained above, the pawls 16a do not engage with the rack 12a in a completely captive manner; and allow the rack to recede in the reverse direction within a certain limitation.

In other words, the ratchet and the rack according to the present invention engage differently in the most-backward position (phantom line) and in the position immediately after the advancement (solid line) as shown in FIG. 6; and consequently, the amount of possible movement therebetween is the amount of the backlash which is indicated by "B" in FIG. 6. By comparing the positions immediately after the advancement in FIG. 6 and FIG. 3 (prior art), the difference will be appreciated.

Figure 7:
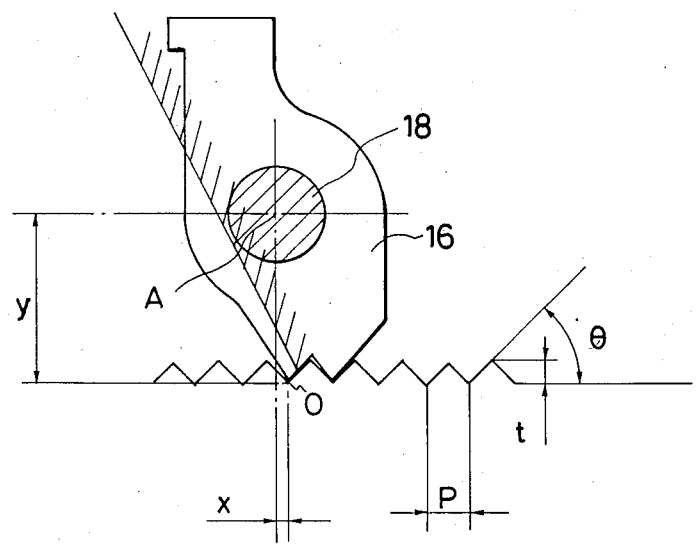
FIG. 7 illustrates how to mathematically determine the supporting position of the ratchet.

FIG. 7 depicts how to determine the position for supporting the ratchet so that the backlash as mentioned above may be secured. O denotes the point of contact of the tip of the pawl of the ratchet 16 in the most-backward position with the rack; A is the center of the pin 18. Then, in the position immediately before the advancement by one pitch (FIG. 5), the following equation may be obtained.

$$(x+l)^2 + (y-t)^2 = x^2 + y^2 \quad (I)$$

Here, x represents the distance from the point O to the point A in the receding direction (amount of off-set), y denotes its vertical component distance, l represents how much the rack has moved, t is the height of the rack, and $\theta$ is the angle of the rack.

Since $$t = (P/2) \tan \theta \quad (II)$$

wherein P represents the pitch of the rack, solving equation (I) with respect to l, obtained is $$l = -x \pm \sqrt{x^2 - \frac{P^2}{4} \tan^2 \theta + Py \tan\theta} \quad (III)$$

Here, the amount of backlash being B as shown in FIG. 6, $$l = B + (P/2) \quad (IV)$$

Therefore, the amount of backlash represented by B is $$B = \sqrt{x^2 - \frac{P^2}{4} \tan^2 \theta + Py \tan\theta} - \left(x + \frac{P}{2}\right) \quad (V)$$

In order to make B 0.5 mm or larger, from the equation (V), $$0.5 \leq \sqrt{x^2 - \frac{P^2}{4} \tan^2 \theta + Py \tan\theta} - \left(x + \frac{P}{2}\right) \quad (VI)$$

and solving the above equation with respect to y, $Y \leq P + 1/P \tan \phi \times + (P+1)^2/4P \tan \phi + P \tan \phi/4$ (VII)

In FIG. 7, by way of example, the area indicated by the hatched lines represents the area in which the equation (VII) is satisfied, assuming P=1 and $\theta$=45 degrees. Namely, if the center of the pin 18 is located somewhere within the above-mentioned area, at least 0.5 mm backlash may be secured immediately after the advancement of the rack by one pitch.

Incidentally, if P=1.5, $\theta$=45 degrees, x=0.3 and y=5.55 (all represented in mm), B becomes 1.75 mm. The amount of backlash B may be determined appropriately according to the dictates in various applications.

It is to be noted that the reference position O in respect to the position of the pin 18 is taken with respect to the tip of the pawl of the ratchet located in the most-backward position. More than two pawls may preferably be provided with a view to positively preventing the ratchet from revolving in the reverse direction.

Figure 8:
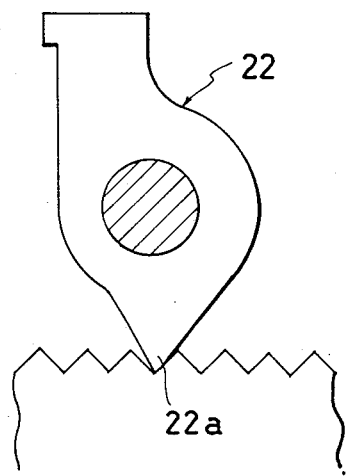
FIG. 8 is a front view of another embodiment of the ratchet.
Figure 9:
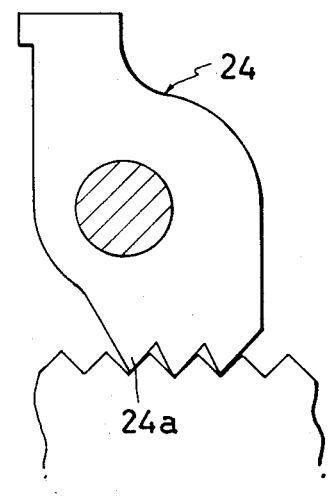
FIG. 9 is also a front view of still another embodiment of the ratchet.

FIGS. 8 and 9 show variations of the ratchets which may be used for the present invention. In FIG. 8, the ratchet 22 comprises only one pawl 22a. On the other hand, the ratchet 24 shown in FIG. 9 comprises three pawls, and is possessed of a stronger resistance against the revolution in the reverse direction. In the case of FIG. 9, the reference pawl in determining the position of the supporting pin of the ratchet is the most-backward one which is represented by the reference numeral 24a.

Figure 10:
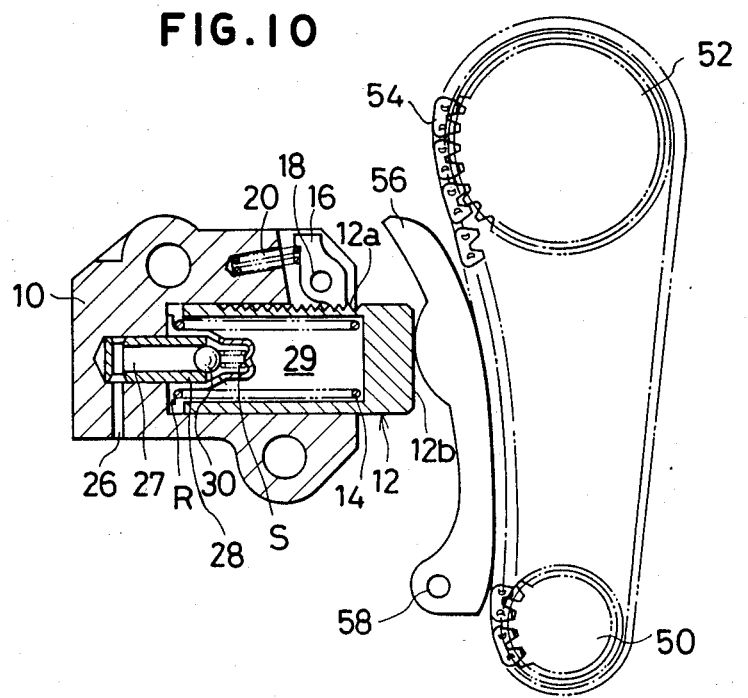
FIG. 10 is a sectional view of the ratchet-type tensioner of FIG. 4 in combination with a fluidic tensioner.
Figure 11:
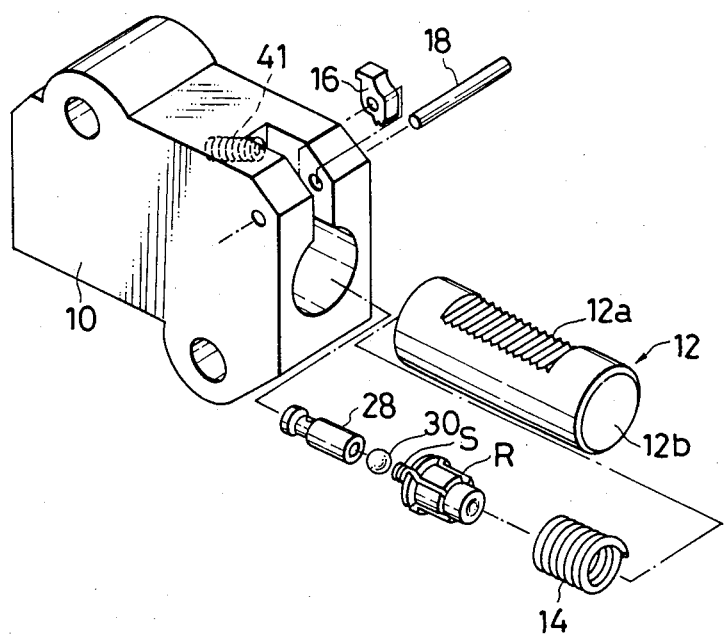
FIG. 11 is an exploded perspective view of the tensioner combination of FIG. 10.

Referring to FIGS. 10 and 11, there is shown in sectional and perspective views the ratchet-type tensioner of FIG. 4, in combination with a fluidic tensioner, for an engine wherein plunger 12 is open at one end and slidably fitted in housing 10 formed with rack 12. Spring 14 is fitted between the closed end of the plunger 12 and the housing 10 to bias the plunger 12 in a protruding direction, pressing an end face 12b against arm 18 by the biasing force to impart tension to chain 54.

Oil passages 26 and 27 are formed in housing 10 and a ball seat 28 to supply an oil chamber 29 in the plunger 12 with oil pressure from an oil pump or other oil pressure source, not shown. Check ball 30 is biased toward the ball seat 28 by a ball spring S which abuts at one end against a retainer R to form a ball-type check valve and permits oil flow into the oil chamber 29 from the passage 27 while blocking oil flow in the reverse direction.

The rack 12a, formed on the outer surface of the plunger 12 as mentioned before, meshes with ratchet 16 in housing 10 and is biased by spring 20 in a direction opposite to the afore-mentioned protruding direction.

Immediately after starting the engine, the oil chamber 29 is not sufficiently filled with oil because of the time lag of the oil pressure supply from the oil pressure source, so that the plunger 12 tends to retract under the influence of reaction of chain 54. However, as mentioned hereinbefore, retraction of the plunger 12 is blocked stepwise by meshing engagement of the rack 12a with the ratchet 16, preventing slacking of the chain 54.

As soon as the oil pressure in the oil chamber 29 is elevated sufficiently, the above-described check ball mechanism operates as a hydraulic check ball tensioner with a stepless no-return function.

Figure 12:
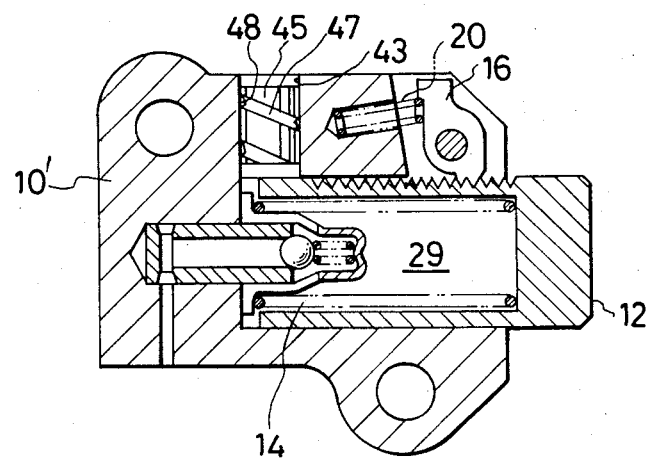
FIG. 12 is a sectional view of another embodiment of the tensioner combination of FIG. 10 with pressure-relief orifice.

Referring to FIG. 12, there is shown a hydraulic ball-type check valve in another embodiment of the invention constructed to discharge excessive oil pressure from the oil chamber 29 through an orifice in addition to the retracting function.

A bore 43 formed in a housing 10′ communicates the oil chamber 29 with the outside, and a plug 45, which has a helical groove 47 on its circumferential surface, presses into the bore 43 to form an orifice 48 bounded by the wall surface of the bore 43 and the helical groove 47.

In this embodiment with the orifice 48, oil discharges through the orifice 48 when the chain is excessively tensioned, thereby preventing generation of unreasonably high oil pressure and rendering the plunger 12 retractable. In this instance, the ratchet-type tensioner employs pawl 16 biased by spring 20, in a direction opposite to the protruding direction of plunger 12.

According to the invention, the pawl 16 controls a limited back-lash before supplying an appropriate oil pressure to the oil chamber 29, and maintains the tension of the chain after an appropriate oil pressure is applied. Besides, the plunger 12 is retractable by the provision of the orifice 48 (and the back-lash of the ratchet 16) in case an unreasonably high reaction force is imposed thereon thereby precluding overtensioning of the chain as well as damage to the tensioner.

What is claimed is:

1. A ratchet-type tensioner for controlling positive backlash in a power transmission device wrapped around rotating members comprising, in combination:
   a housing;
   plunger means slidably protruding from said housing and having a rack formed along the length thereof;
   force exerting means urging said plunger means against the device and thereby applying tension between the members; and
   ratchet means pivotally connected to said housing for engaging said rack, the location of the center of rotation of said ratchet means being a function of the selected backlash B, a distance x parallel to the length of said rack between the center of rotation and its tip in the fully retracted position, a distance y normal to the length of said rack between the center of rotation and its tip in the fully retracted position, and the pitch P and the angle $\theta$ of said rack, the distance x being dependent upon a selected amount of the distance y, or the distance y being dependent upon a selected amount of the distance x.

2. A ratchet-type tensioner according to claim 1 wherein said backlash is at least 0.5 mm immediately after the advancement of said rack in the protruding direction and the center of rotation is located substantially according to the equation $$Y \cong \frac{P+1}{P\tan\theta} X + \frac{(P+1)^2}{4P\tan\theta} + \frac{P\tan\theta}{4}.$$

3. A tensioner according to claim 2, wherein an oil chamber is formed by said housing and plunger for use in combination with a check ball mechanism for allowing oil to enter into and preventing oil from flowing out of said oil chamber.

4. A tensioner according to claim 3 further including an orifice for allowing a restricted flow of oil out of said chamber.

5. A ratchet-type tensioner for controlling positive backlash in a power transmission device wrapped around rotating members comprising, in combination:
   a housing;
   plunger means slidably protruding from said housing and having a rack formed along the length thereof;
   force exerting means urging said plunger means against the device and thereby applying tension between the members; and
   ratchet means pivotally connected to said housing for engaging the teeth of said rack, the location of the center of rotation of said ratchet means being according to the equation $$B = \sqrt{x^2 - \frac{P^2}{4}\tan^2\theta + Py\tan\theta} - \left(x + \frac{P}{2}\right)$$

wherein:
B = a selected backlash,
x = the distance parallel to the length of said rack between the center of rotation of said ratchet means and its tip in the fully retracted position,
y = the distance normal to the length of said rack between the center of rotation of said ratchet means and its tip in the fully retracted position,
P = the pitch of said rack, and
$\theta$ = the angle of said rack; and
the distance x being dependent upon a selected distance y, or the distance y being dependent upon a selected distance x.

6. A tensioner according to claim 5, wherein an oil chamber is formed by said housing and plunger for use in combination with a check ball mechanism for allowing oil to enter into and preventing oil from flowing out of said oil chamber.

7. A tensioner according to claim 6 further including an orifice for allowing a restricted flow of oil out of said chamber.

* * * * *